(12) United States Patent
Sakata

(10) Patent No.: US 11,161,042 B2
(45) Date of Patent: Nov. 2, 2021

(54) VIDEO GAME FOR CHANGING MODEL BASED ON ADJACENCY CONDITION

(71) Applicant: SQUARE ENIX CO., LTD., Tokyo (JP)

(72) Inventor: Shinpei Sakata, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 16/648,453

(22) PCT Filed: Sep. 22, 2017

(86) PCT No.: PCT/JP2017/034275
§ 371 (c)(1),
(2) Date: Mar. 18, 2020

(87) PCT Pub. No.: WO2019/058500
PCT Pub. Date: Mar. 28, 2019

(65) Prior Publication Data
US 2020/0222806 A1 Jul. 16, 2020

(51) Int. Cl.
*A63F 13/58* (2014.01)
*A63F 13/35* (2014.01)
(Continued)

(52) U.S. Cl.
CPC .............. *A63F 13/58* (2014.09); *A63F 13/35* (2014.09); *A63F 13/537* (2014.09); *A63F 13/577* (2014.09)

(58) Field of Classification Search
None
See application file for complete search history.

(56) References Cited

U.S. PATENT DOCUMENTS

2010/0020082 A1   1/2010   Kumakura et al.
2010/0248825 A1*  9/2010   Toyoda ................... A63F 13/10
                                                           463/30
(Continued)

FOREIGN PATENT DOCUMENTS

JP   2008-071271    3/2008
JP   2008-272124   11/2008
(Continued)

OTHER PUBLICATIONS

International Search Report (ISR) from International Searching Authority (Japan Patent Office) in International Pat. Appl. No. PCT/JP2017/034275, dated Nov. 28, 2017.

*Primary Examiner* — Ronald Laneau
(74) *Attorney, Agent, or Firm* — Greenblum & Bernstein, P.L.C.

(57) ABSTRACT

A system for changing appearance of a character composed of a plurality of models judges whether a model can be changed or not on the basis of whether an adjacency condition is satisfied or not. Whether the adjacency condition is satisfied or not is judged on the basis of a shape of a judgement target and a shape of a model adjacent to a change target. The system may refer to a type of a shape set to each model to judge whether the adjacency condition is satisfied or not. The system may also refer to a type regarding a portion adjacent to another model set to each model for the judgement. Moreover, the system may adjust a shape of an adjacent model on the basis of information that is set to the model.

6 Claims, 11 Drawing Sheets

(51) Int. Cl.
*A63F 13/537* (2014.01)
*A63F 13/577* (2014.01)

(56) References Cited

U.S. PATENT DOCUMENTS

| | | | | |
|---|---|---|---|---|
| 2015/0099581 | A1* | 4/2015 | Miyama | A63F 13/56 |
| | | | | 463/31 |
| 2016/0343166 | A1* | 11/2016 | Inoko | G06T 7/73 |
| 2018/0181976 | A1* | 6/2018 | Takei | G06Q 30/0209 |
| 2018/0181987 | A1* | 6/2018 | Omori | G06Q 30/0255 |

FOREIGN PATENT DOCUMENTS

| | | |
|---|---|---|
| JP | 2009-104522 | 5/2009 |
| JP | 2010-033298 | 2/2010 |

\* cited by examiner

Fig. 13
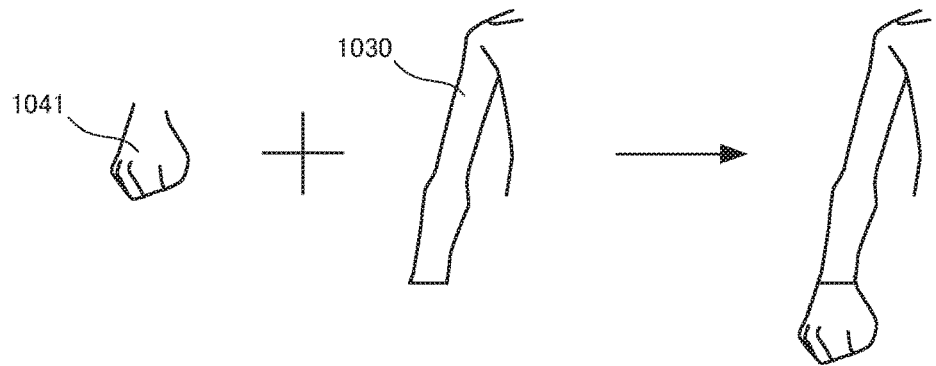
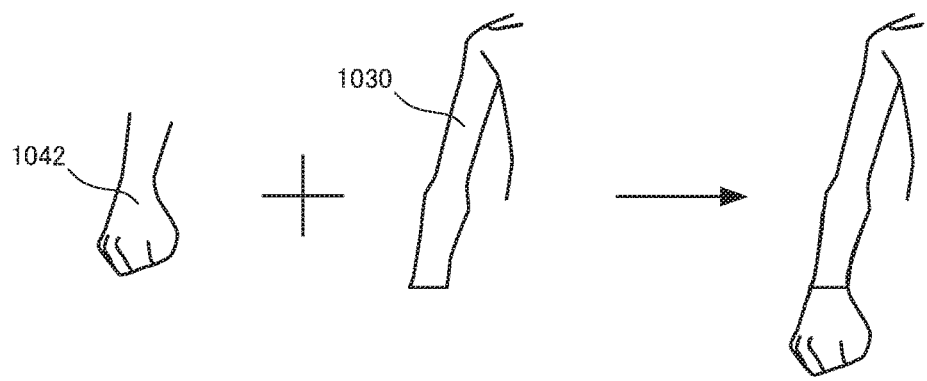
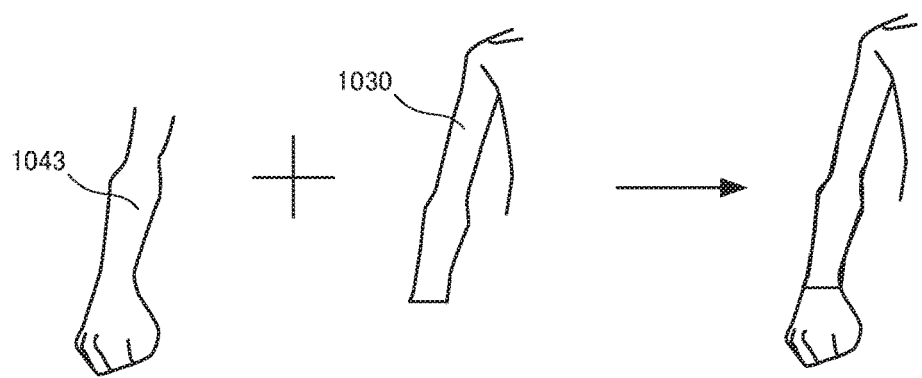
Fig. 14
INFORMATION INDICATING FIRST ADJACENCY CONDITION
|  | S MATCHING BODY | M MATCHING BODY | L MATCHING BODY |
|---|---|---|---|
| S HAND MODEL | ○ | ○ | ○ |
| M HAND MODEL | × | ○ | ○ |
| L HAND MODEL | × | × | ○ |

Fig. 15
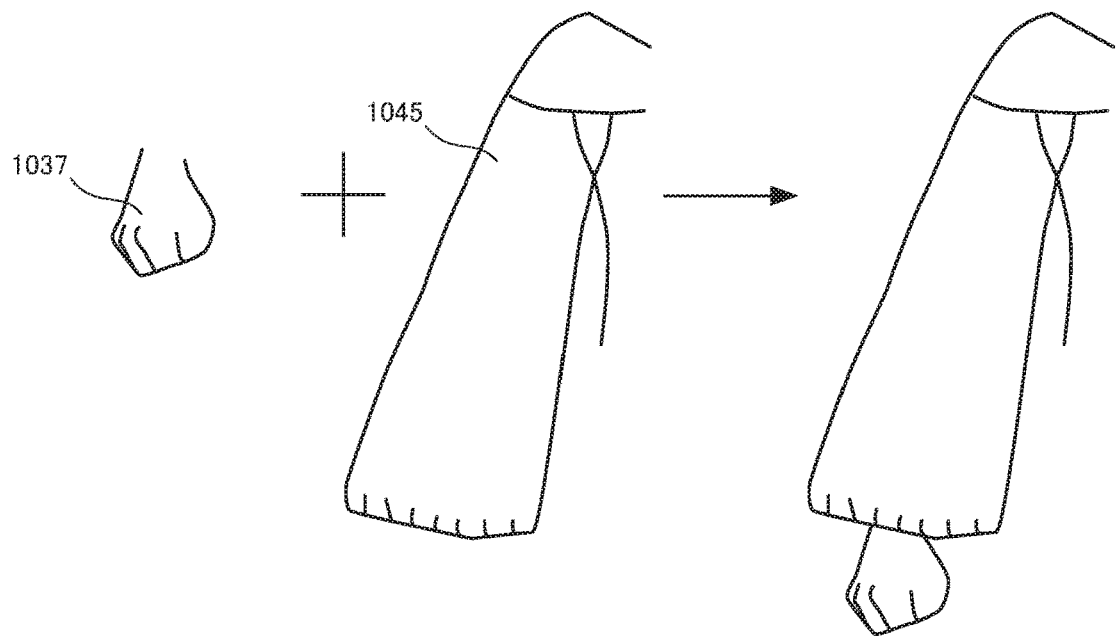
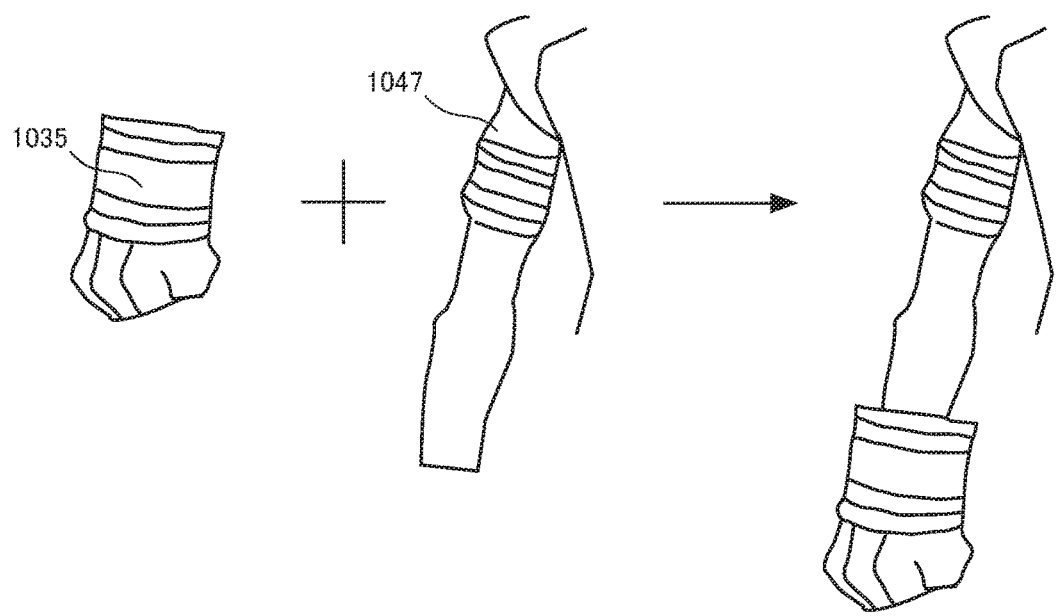
Fig. 16
INFORMATION INDICATING SECOND ADJACENCY CONDITION
|  | S ARM BODY | L ARM BODY |
|---|---|---|
| S SIZE HAND | ○ | ○ |
| L SIZE HAND | ○ | × | ed to specify at least one model as a judgement target; a
VIDEO GAME FOR CHANGING MODEL BASED ON ADJACENCY CONDITION

TECHNICAL FIELD

At least one of embodiments according to the present invention relates to a program for causing a user terminal to realize functions to change appearance of a character composed of a plurality of models. Further, at least one of the embodiments according to the present invention relates to a system for changing appearance of a character composed of a plurality of models, which includes a communication network, a server, and a user terminal. Further, at least one of the embodiments according to the present invention relates to a program for causing a server to realize functions to change appearance of a character composed of a plurality of models.

BACKGROUND ART

Heretofore, there has been a system that changes appearance of a character at predetermined timing.

In such systems, there is one in which appearance setting of a character is registered to each of N types ("N" is an arbitrary integer and two or more) of registration setting data, to which the appearance setting of the character can be registered, in accordance with an operational input of a user (see Patent Document 1).

PRIOR ART DOCUMENTS

Patent Documents

Patent Document 1: Japanese Patent Application Publication No. 2008-272124

SUMMARY OF THE INVENTION

Problems to be Solved by the Invention

In such a system, it may be effective to prohibit two adjacent models from overlapping with each other in order to prevent appearance of a character from being impaired. In this case, for example, a configuration may be considered in which it is judged whether each model can be set to the character or not by judging whether the respective models collide with each other. However, such a configuration may become an excessive processing load. For that reason, in a case where appearance of a character is changed without impairing the appearance of the character, ingenuity for reducing a processing load compared with a case where collision judgement is executed has been required.

It is an object of at least one embodiment of the present invention to provide a system by which appearance of a character is changed without impairing the appearance of the character by a configuration with a smaller processing load.

Means for Solving the Problems

According to a non-limiting aspect, a program according to one embodiment of the present invention is a program for causing a user terminal to realize functions to change appearance of a character composed of a plurality of models, wherein the functions include: a specifying function configured to specify at least one model as a judgement target; a judging function configured to judge, in a case where a model of a portion corresponding to the judgement target among a plurality of models (hereinafter, referred to as a "change target") is changed into the judgement target, whether a predetermined adjacency condition is satisfied or not on a basis of a shape of the judgement target and a shape of a model adjacent to the change target, the plurality of models constituting the character; and a determining function configured to determine whether the change target can be changed into the judgement target or not on a basis of a judgement result by the judging function.

According to a non-limiting aspect, a system according to one embodiment of the present invention is a system for changing appearance of a character composed of a plurality of models, the system including: a specifying unit configured to specify at least one model as a judgement target; a judging unit configured to judge, in a case where a model of a portion corresponding to the judgement target among a plurality of models (hereinafter, referred to as a "change target") is changed into the judgement target, whether a predetermined adjacency condition is satisfied or not on a basis of a shape of the judgement target and a shape of a model adjacent to the change target, the plurality of models constituting the character; and a determining unit configured to determine whether the change target can be changed into the judgement target or not on a basis of a judgement result by the judging unit.

According to a non-limiting aspect, a program according to one embodiment of the present invention is a program for causing a server to realize functions to change appearance of a character composed of a plurality of models, wherein the functions include: a specifying function configured to specify at least one model as a judgement target; a judging function configured to judge, in a case where a model of a portion corresponding to the judgement target among a plurality of models (hereinafter, referred to as a "change target") is changed into the judgement target, whether a predetermined adjacency condition is satisfied or not on a basis of a shape of the judgement target and a shape of a model adjacent to the change target, the plurality of models constituting the character; and a determining function configured to determine whether the change target can be changed into the judgement target or not on a basis of a judgement result by the judging function.

Effects of the Invention

According to each of the embodiments of the present application, one or two or more shortages are solved.

BRIEF DESCRIPTION OF THE DRAWINGS

FIG. 13 is an explanatory drawing for explaining concept corresponding to at least one of the embodiments according to the present invention.

FIG. 14 is an explanatory drawing for explaining an example of a storage state of information corresponding to at least one of the embodiments according to the present invention.

FIG. 15 is an explanatory drawing for explaining concept corresponding to at least one of the embodiments according to the present invention.

FIG. 16 is an explanatory drawing for explaining an example of a storage state of information corresponding to at least one of the embodiments according to the present invention.

DESCRIPTION OF THE EMBODIMENTS

Hereinafter, examples of embodiments according to the present invention will be described with reference to the drawings. In this regard, various kinds of elements in an example of each embodiment, which will be described below, can appropriately be combined with each other in a range where contradiction or the like did not occur. Further, explanation of the content that will be described as an example of an embodiment may be omitted in another embodiment. Further, the content of operations and/or processing with no relationship to characteristic portions of each embodiment may be omitted. Moreover, various kinds of processing that constitute various kinds of processing flows (will be described below) may be carried out in random order in a range where contradiction or the like did not occur in the content of the processing.

First Embodiment

Figure 1:
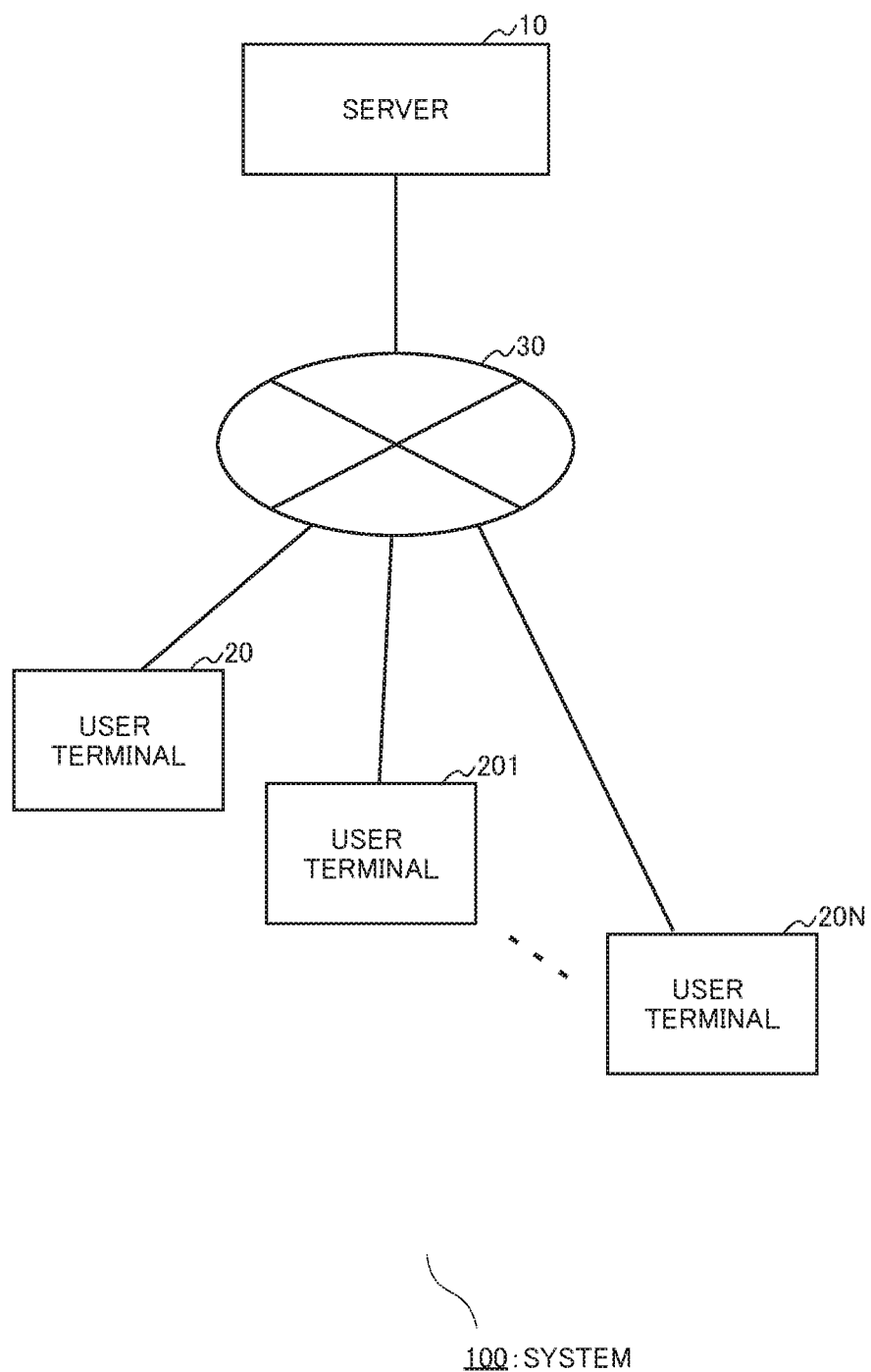
FIG. 1 is a block diagram illustrating an example of a configuration of a system corresponding to at least one of the embodiments according to the present invention.

FIG. 1 is a block diagram illustrating an example of a configuration of a system 100 according to one embodiment of the present invention. As illustrated in FIG. 1, the system 100 includes a server 10, and user terminals 20, and 201 to 20N respectively used by users of the system 100 ("N" is an arbitrary integer. Hereinafter, they are simply referred to as "terminals 20, and 201 to 20N"). In this regard, the configuration of the system 100 is not limited to this configuration. The system 100 may be configured so that a plurality of users uses a single terminal, or may be configured so as to include a plurality of servers.

Each of the server 10 and the plurality of terminals 20 and 201 to 20N is connected to a communication network 30 such as the Internet. In this regard, although it is not illustrated in the drawings, the plurality of terminals 20 and 201 to 20N is connected to the communication network 30 by carrying out data communication with base stations managed by a telecommunication carrier by means of a radio communication line.

The system 100 includes the server 10 and the plurality of terminals 20, and 201 to 20N, thereby executing various kinds of processes to change appearance of a character composed of a plurality of models.

Here, the model means one constituting a character that appears in a video game. It is suitable that the model can be set to each portion of one character (for example, an arm, a foot, or a body). As an example of the model, there is one that can be set to each predetermined classification. The predetermined classification is not limited to biological border. For example, an object obtained by combining a torso and arms may be set to one classification, and hands may be set to another classification. Further, the character means a person or an animal that appears in the video game. The character is not limited particularly so long as it is a so-called object. It is preferable that appearance can be changed for each site. As an example of the character, there is a so-called avatar. In this regard, each model may be configured so that the user can possess each model as one item.

The server 10 is managed by an administrator of the system 100, and has various kinds of functions to provide information regarding the various kinds of processes to each of the plurality of terminals 20, 201 to 20N. In the present embodiment, the server 10 is constructed by an information processing apparatus, such as a WWW server, and includes a storage medium for storing various kinds of information. In this regard, the server 10 is provided with a general configuration for carrying out the various kinds of processes, such as a control section, as a computer. However, its explanation herein is omitted. Further, in the system 100, it is preferable that the server 10 manages various kinds of information from a point of view to reduce a processing load on each of the plurality of terminals 20, 201 to 20N. However, a storage region may be provided in a state that the server 10 can access the storage region. For example, the server 10 may be configured so as to be provided with a dedicated storage region outside the server 10.

Figure 2:
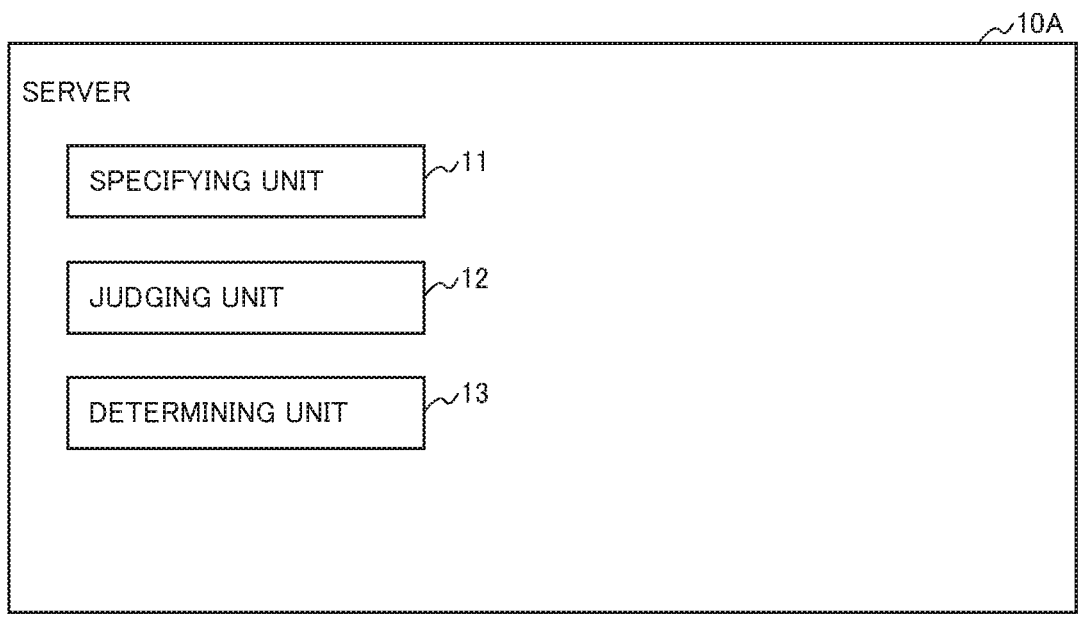
FIG. 2 is a block diagram illustrating a configuration of a server corresponding to at least one of the embodiments according to the present invention.

FIG. 2 is a block diagram illustrating a configuration of a server 10A that is an example of the configuration of the server 10. As illustrated in FIG. 2, the server 10A at least includes a specifying unit 11 (which corresponds to one example of a specifying function), a judging unit 12 (which corresponds to one example of a judging function), and a determining unit 13 (which corresponds to one example of a determining function).

The specifying unit 11 has a function to execute a process for specifying at least one model as a judgement target. Here, the judgement target means a model that becomes a target of predetermined judgement among models that appear in the video game. A configuration for specifying a judgement target is not limited particularly. However, it is preferable that one that satisfies a predetermined condition to become a judgement target is set to the judgement target. As an example of such a configuration, there is a configuration in which a model selected by the user is set to a judgement target.

The judging unit 12 has a function to execute a process for judging, in a case where a model of a portion corresponding to the judgement target among a plurality of models constituting a character (hereinafter, referred to as a "change target") is changed into the judgement target, whether a predetermined adjacency condition is satisfied or not on the basis of a shape of the judgement target and a shape of a model adjacent to the change target. Here, the portion corresponding to the judgement target means a portion that has a site attribute the same as a site attribute of the judgement target or becomes a substitute for the site attribute of the judgement target. Further, the site attribute means an attribute indicating which site of a model the portion is, for example, an arm, a leg, or a hand. For example, in a case where the judgement target is a model indicating an arm, the "model of the portion corresponding to the judgement target among the plurality of models constituting the character" becomes a model indicating an arm among the models constituting the character, or a model of a site that becomes a substitute for the arm. Further, a case where the change target is changed into the judgement target means that a model or models, which is/are a part of models that currently constitutes a character is changed into another model. As an example of the case where the change target is changed into the judgement target, there is a case where a hand model MDL1 is changed into a hand model MDL2. Further, the adjacency condition is a condition for preventing a state where a plurality of models collides with each other (so-called interference) from occurring. The content of the adjacency condition is not limited particularly. However, it is suitable that the adjacency condition relates a shape of the model (for example, a size, a length, a form, a design or the like). As an example of the adjacency condition, there is a condition that a shape A can adjoin to another shape A. As another example of the adjacency condition, there is a condition that a shape B can adjoin to a shape A and another shape B. In this regard, the adjacency condition may be configured by a plurality of necessary conditions or requirements. Further, the word "adjoin" means a relationship of two models, which has an adjoining positional relationship, among plural kinds of models that constitute one character. Namely, in the present embodiment, even a case where two models actually have no contact with each other may be included in a state of the word "adjoin". As an example of a situation that two models adjoin to each other, there is a situation that two models are directly coupled to each other. As another example of the situation that two models adjoin to each other, there is a situation that two models are indirectly coupled to each other via any other object (for example, an arm of the character).

The determining unit 13 has a function to execute a process for determining whether the change target can be changed into the judgement target or not on the basis of a judgement result. How to utilize the determination by the determining unit 13 is not limited particularly. The determination by the determining unit 13 is utilized for a process to cause the user to be not able to select an unchangeable model, a process to inform the user of whether the model can be changed or not, and a process to change the model, for example.

Each of the plurality of terminals 20, and 201 to 20N is managed by the user (or a player) who plays the video game, and is configured by a communication terminal, such as a cellular phone terminal, a PDA (Personal Digital Assistants), or a mobile game device, by which the user can play a network delivery type video game, for example. In this regard, a configuration of the terminal that the system 100 can include is not limited to the examples described above. It may be a configuration in which the user can recognize the video game. As other examples of the configuration of the terminal, there are a so-called wearable divide such as a smartwatch, and a combination of the wearable divide and the communication terminal.

Further, each of the plurality of terminals 20, and 201 to 20N is connected to the communication network 30, and includes hardware (for example, a display device for displaying a game screen, an audio output device and the like) and software for executing the video game by communicating with the server 10. In this regard, each of the plurality of terminals 20, and 201 to 20N may be configured so as to be capable of directly communicating with each other without the server 10. Further, each of the plurality of terminals 20, and 201 to 20N outputs an image of the video game to its own display device on the basis of information transmitted from the server 10 (for example, information regarding a game image).

Next, an operation of the system 100 according to the present embodiment will be described.

Figure 3:
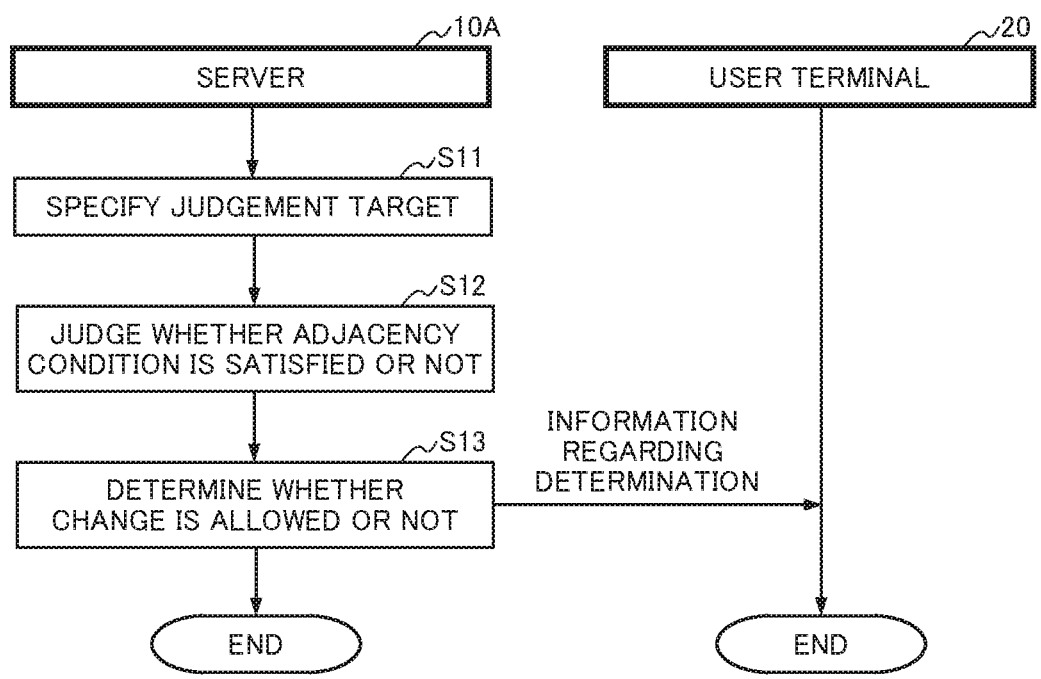
FIG. 3 is a flowchart illustrating an example of game related processing corresponding to at least one of the embodiments according to the present invention.

FIG. 3 is a flowchart illustrating an example of game related processing executed by the system 100. Hereinafter, a case where the server 10A and the terminal 20 execute transmission and reception of information regarding the video game will be described as an example. In this regard, the game related processing according to the present embodiment is executed in a case where a change request for changing a model of a hand of a character is received from a user.

In the game related processing, the server 10A first specifies a judgement target (Step S11). In the present embodiment, the server 10A specifies a hand model MDL1 designated by the user as a judgement target.

When the judgement target is specified, the server 10A judges whether an adjacency condition is satisfied or not (Step S12). In the present embodiment, in a case where a hand model MDL2 of a current character is changed into a hand model MDL1, the server 10A judges whether the adjacency condition is satisfied or not on the basis of a shape of the hand model MDL1 and a shape of a model adjacent to the hand model MDL2.

The server 10A determines whether a change target can be changed into the judgement target or not on the basis of a judgement result (Step S13). In the present embodiment, in a case where the judgement result indicates that the adjacency condition is satisfied, the server 10A determines that the hand model MDL2 can be changed into the hand model MDL1. On the other hand, in the present embodiment, in a case where the judgement result indicates that the adjacency condition is not satisfied, the server 10A determines that the hand model MDL2 cannot be changed into the hand model MDL1. Moreover, the server 10A transmits information regarding the determination to the terminal 20.

Figure 4:
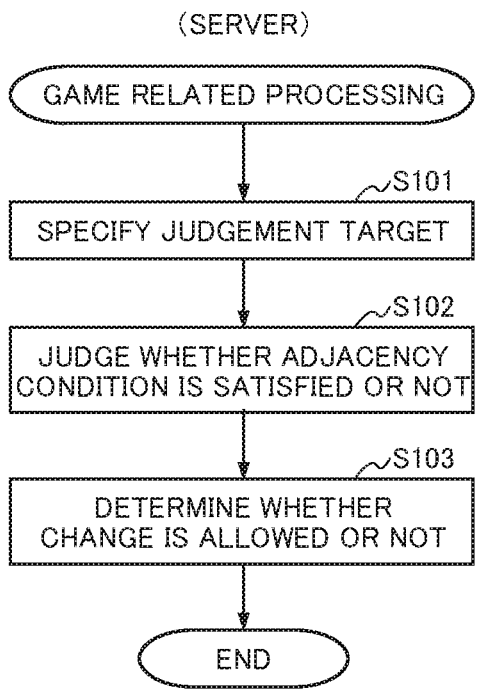
FIG. 4 is a flowchart illustrating an example of an operation at a server side in the game related processing corresponding to at least one of the embodiments according to the present invention.

FIG. 4 is a flowchart illustrating an example of an operation of the server 10A side in the game related processing. Here, an operation of the server 10A in the system 100 will be described again.

In the game related processing, the server 10A first specifies a judgement target (Step S101); judges whether an adjacency condition is satisfied or not (Step S102); determines whether a change target can be changed into the judgement target or not (Step S103), and terminates the processing herein.

Figure 5:
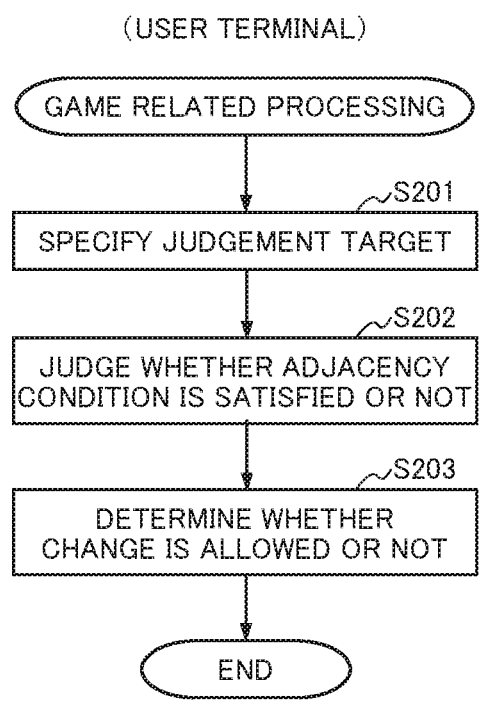
FIG. 5 is a flowchart illustrating an example of an operation of a terminal side in the game related processing corresponding to at least one of the embodiments according to the present invention.

FIG. 5 is a flowchart illustrating an example of an operation of the terminal 20 in a case where the terminal 20 executes the game related processing. Hereinafter, the case where the terminal 20 executes the game related processing by a single body will be described as an example. In this regard, the terminal 20 is configured to include similar functions to the configuration of the server 10A. For this reason, its description is omitted from a point of view to avoid repeated explanation.

In the game related processing, the terminal 20 first specifies a judgement target (Step S201); judges whether an adjacency condition is satisfied or not (Step S202); determines whether a change target can be changed into the judgement target or not (Step S203); and terminates the processing herein.

As explained above, as one side of the first embodiment, the system 100 for controlling progress of the video game is configured so as to at least include the specifying unit 11, the judging unit 12, and the determining unit 13. Thus, the specifying unit 11 specifies at least one model as the judgement target; in a case where the change target is changed into the judgement target, the judging unit 12 judges whether the predetermined adjacency condition is satisfied or not on the basis of the shape of the judgement target and the shape of the model adjacent to the change target; and the determining unit 13 determines whether the change target can be changed into the judgement target on the basis of the judgement result. Therefore, it is possible to change appearance of a character without impairing the appearance of the character by a configuration with a smaller processing load.

In particular, the system 100 judges whether the adjacency condition is satisfied or not on the basis of the mutual shapes of the adjacent models. Namely, in a case where the mutual shapes of the adjacent models satisfy the adjacency condition in the system 100, it is possible to change one model into the other model that satisfies the adjacency condition. By configuring the system 100 in this manner, it is possible to change appearance of a character without impairing the appearance of the character by a configuration with a smaller processing load compared with a case where judgement of whether the models collide with each other (that is, collision judgement of the models) is executed.

Second Embodiment

Figure 6:
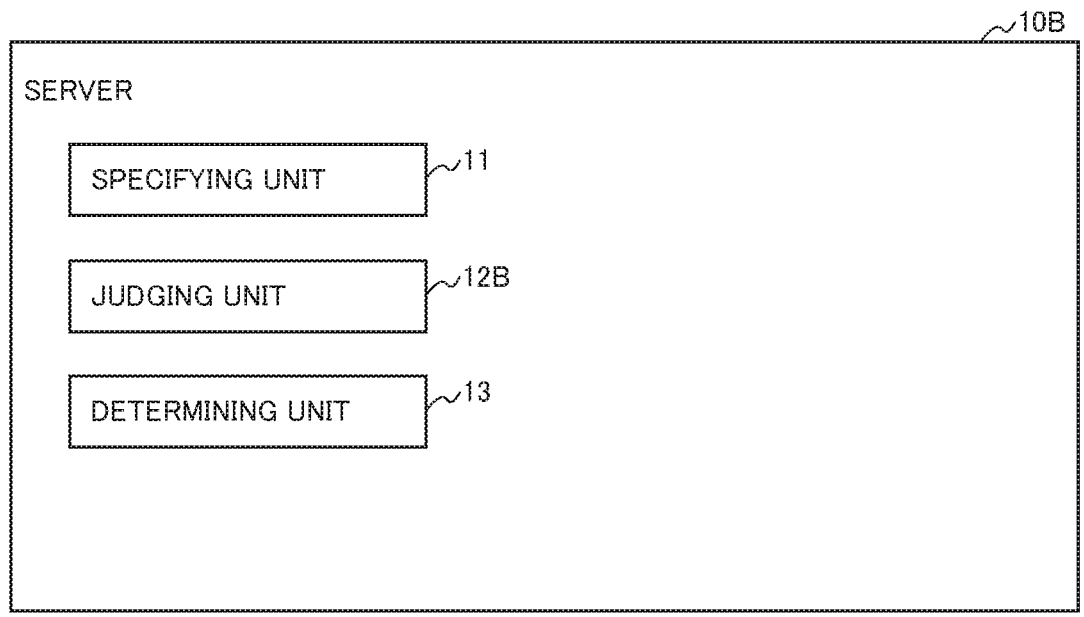
FIG. 6 is a block diagram illustrating a configuration of a server corresponding to at least one of the embodiments according to the present invention.

FIG. 6 is a block diagram illustrating a configuration of a server 10B, which is an example of the server 10. In the present embodiment, the server 10B at least includes a specifying unit 11, a judging unit 12B (which corresponds to one example of a judging function), and a determining unit 13.

The judging unit 12B has a function to execute a process for referring to a type of a shape that is set to each of models to judge whether a predetermined adjacency condition is satisfied or not. Here, a configuration for setting the type of the shape to each of the models is not limited particularly. However, it is suitable that information regarding the models is stored so as to contain the type of the shape thereof when the information is to be stored. Further, as an example of the configuration to refer to the type of the shape thereof for judgement, there is a configuration in which judgement is made on the basis of a type of a judgement target, a type of a shape of a model adjacent to a change target, and information defining types that are allowed to adjoin thereto. In this regard, the server 10B may be configured so that various kinds of information are stored in a predetermined storage region.

Figure 7:
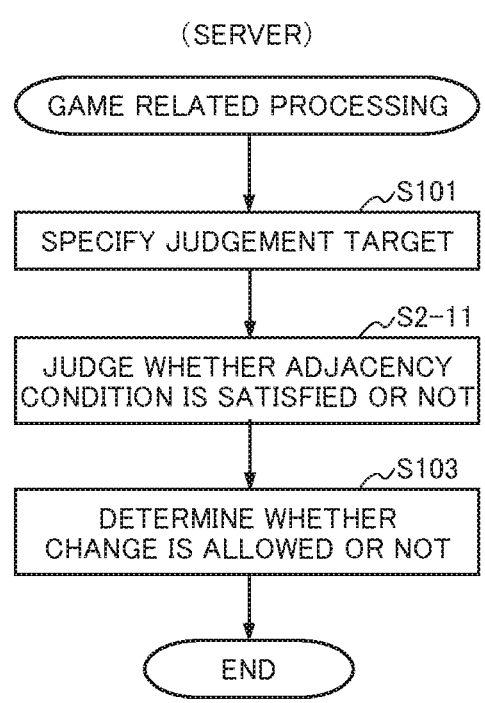
FIG. 7 is a flowchart illustrating an example of game related processing corresponding to at least one of the embodiments according to the present invention.

FIG. 7 is a flowchart illustrating an example of game related processing executed by the system 100. Hereinafter, an operation of the server 10B side will be described as an example. In this regard, explanation for a case where the terminal 20 (that is, a terminal 20 that includes similar functions to the configuration of the server 10B) executes the game related processing by a single body, and portions that have already been explained are omitted from a point of view to avoid repeated explanation.

When a judgement target is specified, the server 10B refers to a type of a shape that is set to each model to judge whether a predetermined adjacency condition is satisfied or not (Step S2-11). In the present embodiment, in a case where a hand model MDL2 is changed into a hand model MDL1, the server 10B judges whether the adjacency condition is satisfied or not on the basis of a type of a shape of the hand model MDL1, a type of a shape of a model adjacent to the hand model MDL2, and information defining types that are allowed to adjoin thereto.

As explained above, as one side of the second embodiment, the system 100 is configured so as to at least include the specifying unit 11, the judging unit 12B, and the determining unit 13. Thus, the judging unit 12B refers to the type of the shape that is set to each of the models to judge whether the predetermined adjacency condition is satisfied or not. Therefore, it is possible to change appearance of a character without impairing the appearance of the character by a configuration with a smaller processing load.

Namely, each model has the type of the shape, whereby compared with a case where collision judgement is executed, it is possible to make a processing load smaller in a case where appearance of a character is changed without impairing the appearance of the character even in a video game in which models with various shapes are adopted. In other words, the system 100 can realize diversity of the models with a smaller processing load than that in a conventional technique in the video game in which appearance of a character is changed without impairing the appearance of the character. Further, in a case where a new model is added thereto, it is possible to deal with it without rewriting information on conventional models. Therefore, the system 100 can improve the degree of freedom in design of the model with a smaller processing load than that in the conventional technique.

Third Embodiment

Figure 8:
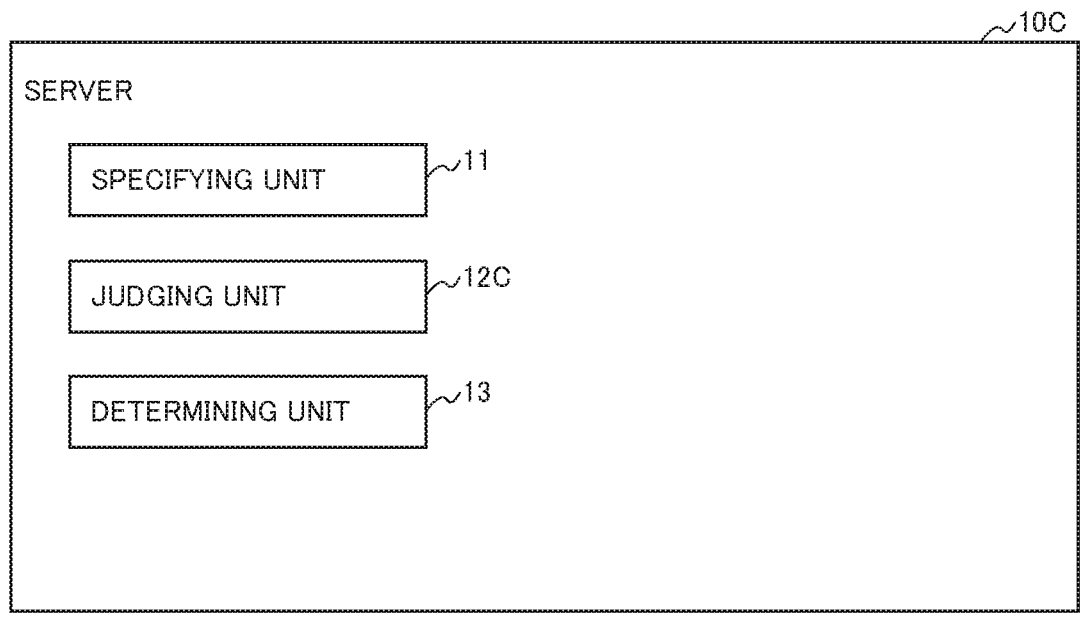
FIG. 8 is a block diagram illustrating a configuration of a server corresponding to at least one of the embodiments according to the present invention.

FIG. 8 is a block diagram illustrating a configuration of a server 10C, which is an example of the server 10. In the present embodiment, the server 10C at least includes a specifying unit 11, a judging unit 12C (which corresponds to one example of a judging function), and a determining unit 13.

The judging unit 12C has a function to execute a process for referring to a type regarding a portion adjacent to another model that is set to each of models (hereinafter, referred to as an "adjacent portion type") to judge whether a predetermined adjacency condition is satisfied or not. Here, a configuration for setting the adjacent portion type to each of the models is not limited particularly. However, it is suitable that information regarding the models is stored so as to contain the adjacent portion type when the information is to be stored. Further, as an example of the configuration to refer to the adjacent portion type for judgement, there is a configuration in which judgement is made on the basis of an adjacent portion type of a judgement target, an adjacent portion type of a model adjacent to a change target, and information defining adjacent portion types that are allowed to adjoin thereto. In this regard, the server 10C may be configured so that various kinds of information are stored in a predetermined storage region.

Figure 9:
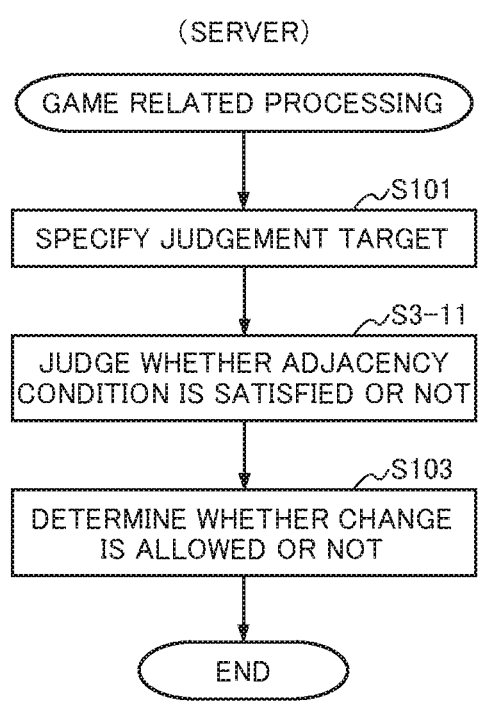
FIG. 9 is a flowchart illustrating an example of game related processing corresponding to at least one of the embodiments according to the present invention.

FIG. 9 is a flowchart illustrating an example of game related processing executed by the system 100. Hereinafter, an operation of the server 10C side will be described as an example. In this regard, explanation for a case where the terminal 20 (that is, the terminal 20 that includes similar functions to the configuration of the server 10C) executes the game related processing by a single body, and portions that have already been explained are omitted from a point of view to avoid repeated explanation.

When the judgement target is specified, the server 10C refers to an adjacent portion type that is set to each of models to judge whether a predetermined adjacency condition is satisfied or not (Step S2-11). In the present embodiment, in a case where a hand model MDL2 is changed into a hand model MDL1, the server 10C judges whether the adjacency condition is satisfied or not on the basis of the adjacent portion type of the hand model MDL1, the adjacent portion type of a model adjacent to the hand model MDL2, and information defining adjacent portion types that are allowed to adjoin thereto.

As explained above, as one side of the third embodiment, the system 100 is configured so as to at least include the specifying unit 11, the judging unit 12C, and the determining unit 13. Thus, the judging unit 12C refers to the adjacent portion type that is set to each of the models to judge whether the predetermined adjacency condition is satisfied or not. Therefore, it is possible to change appearance of a character without impairing the appearance of the character by a configuration with a smaller processing load.

Namely, each model has the adjacent portion type, whereby compared with a case where collision judgement is executed, it is possible to make a processing load smaller in a case where appearance of a character is changed without impairing the appearance of the character even in a video game in which models with various shapes are adopted. The system 100 can realize diversity of the models with a smaller processing load than that in a conventional technique in the video game in which appearance of a character is changed without impairing the appearance of the character. Further, in a case where a new model is added thereto, it is possible to deal with it without rewriting information on conventional models. Therefore, the system 100 can improve the degree of freedom in design of the model with a smaller processing load than that in the conventional technique.

Fourth Embodiment

Figure 10:
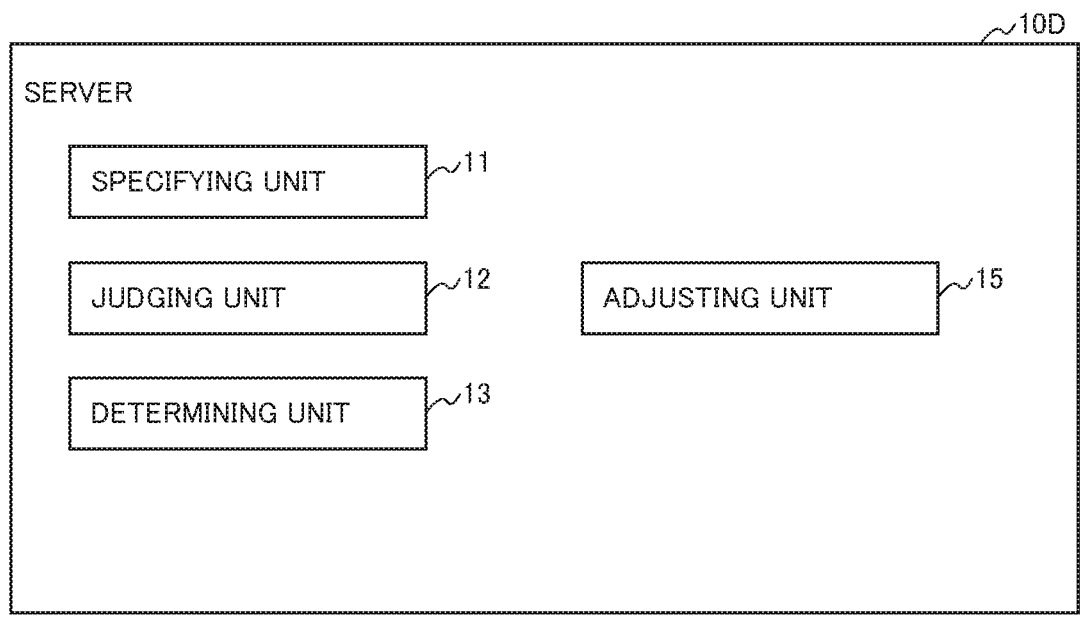
FIG. 10 is a block diagram illustrating a configuration of a server corresponding to at least one of the embodiments according to the present invention.

FIG. 10 is a block diagram illustrating a configuration of a server 10D, which is an example of the server 10. In the present embodiment, the server 10D at least includes a specifying unit 11, a judging unit 12, a determining unit 13, and an adjusting unit 15 (which corresponds to one example of an adjusting function).

The adjusting unit 15 has a function to execute a process for adjusting a shape of an adjacent model on the basis of information that is set to a model. The phrase "adjusting a shape of an adjacent model" means that a shape of at least a part of an adjacent model is changed so that models do not interfere with each other. A configuration to adjust a shape of a model is not limited particularly. However, it is suitable to refer to a taper value that is set to at least one of adjacent models, and change a shape of one model that becomes an adjustment target. As an example of such a configuration, there is a configuration in which a shape of a joint portion of a model, positioned at a central side of a character, among adjacent models is gradually tapered toward a terminal portion. Further, as another example of the configuration to adjust the shape of the model, there is a configuration in which a shape of one model or shapes of mutual models is/are adjusted so that predetermined reference positions of the models (that is, a reference position for adjustment) are matched with each other. In this regard, a configuration for setting a taper value to at least one of adjacent models is not limited particularly. As an example of such a configuration, there is a configuration in which a character is configured by one body model, two hand models, and two foot models, and taper values are set to the respective hand models and the respective foot models.

Figure 11:
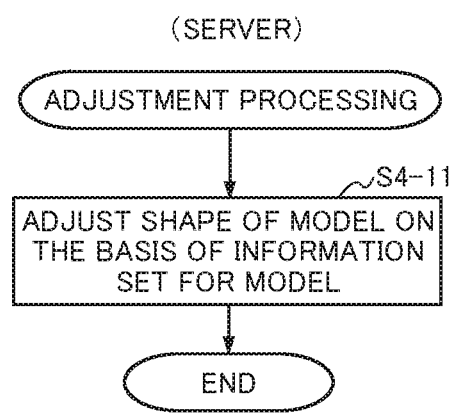
FIG. 11 is a flowchart illustrating an example of adjustment processing corresponding to at least one of the embodiments according to the present invention.

FIG. 11 is a flowchart illustrating an example of adjustment processing executed by the system 100. Hereinafter, an operation of the server 10D side will be described as an example. In this regard, explanation for a case where the terminal 20 (that is, a terminal 20 that includes similar functions to the configuration of the server 10D) executes the adjustment processing by a single body, and portions that have already been explained are omitted from a point of view to avoid repeated explanation. In this regard, in the present embodiment, a case where a change of a hand model is executed will be described as an example.

In the adjustment processing, the server 10D first adjusts a shape of adjacent models on the basis of information that is set to a model (Step S4-11), and terminates the processing herein. In the present embodiment, the server 10D gradually tapers a shape of a joint portion of a body model (that is, a portion that is connected to each of hand models and foot models) toward a terminal portion thereof on the basis of information that is set to each of two hand models and two foot models.

As explained above, as one side of the fourth embodiment, the system 100 is configured so as to at least include the specifying unit 11, the judging unit 12, the determining unit 13, and the adjusting unit 15. Thus, the adjusting unit 15 adjusts the shape of the adjacent model on the basis of the information that is set to the model. Therefore, it is possible to change appearance of a character without impairing the appearance of the character by a configuration with a smaller processing load.

Namely, the system 100 is configured so as to adjust a model, for which it is judged that the model can be changed, on the basis of the information that is set to the model while allowing the model to interfere with another adjacent model, thereby realizing a change in appearance of a character without impairing appearance thereof. In other words, upon providing a system by which appearance of a character is not impaired, the system 100 uses information that is set to the model without narrowing down models for each of which an adjacency condition is satisfied (that is, without enlarging restrictions in design of the model), thereby allowing a flexible response. Therefore, the system 100 can change appearance of a character without impairing the appearance of the character by a configuration with a smaller processing load, and variegate a combination of models.

Fifth Embodiment

In the present embodiment, a system 100 can change appearance of a character (for example, an avatar) composed of a plurality of models. An owner of the character is allowed to combine various models, thereby enjoying customizing of the character.

Figure 12:
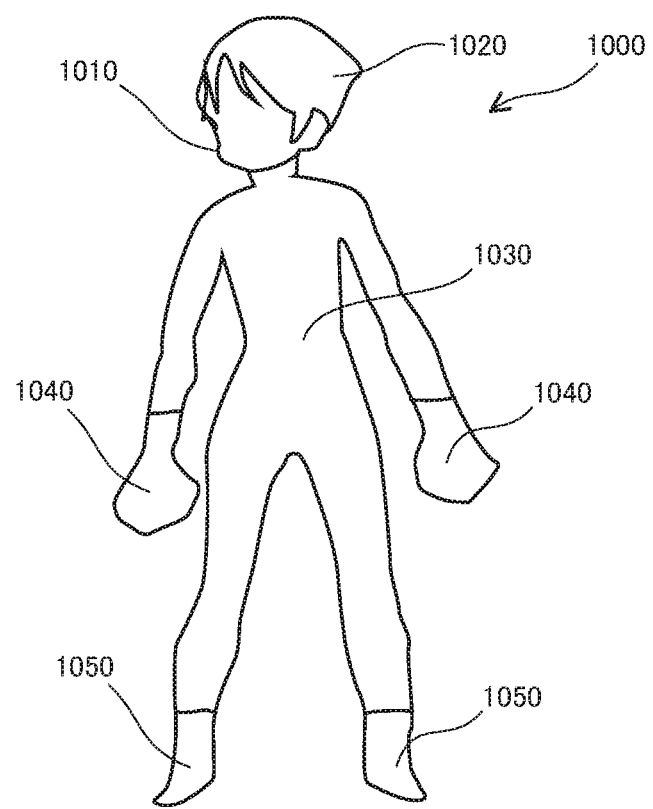
FIG. 12 is an explanatory drawing for explaining concept corresponding to at least one of the embodiments according to the present invention.

FIG. 12 is an explanatory drawing for explaining a concept of models that constitute a character. As illustrated in FIG. 12, a character 1000 is composed of five kinds of models that include a face model 1010, a hair model 1020, a body model 1030, hand models 1040, and foot models 1050. Here, up to which site the body model 1030 contains is defined in advance. Specifically, arm (up to a wrist), a chest, a belly, a neck, and a leg (up to an ankle) are sites that constitute the body model 1030. On the other hand, with respect to each of the hand model 1040 and the foot model 1050, there are plural types of constituent sites. In the hand model 1040, there are constituent sites thereof such as one having a range from fingers of a hand to an arm, and one having a range from fingers of a hand to an elbow. Further, similarly, with respect to the foot model 1050, there are constituent sites of the foot model 1050 such as one having a range from toes to an ankle, and one having a range from toes to a knee.

In this regard, FIG. 12 illustrates a character in a nude state. Namely, clothes, items and the like are not reflected to the character, and a model constituting the character becomes a model indicating a nature state of the character. However, the model according to the present embodiment includes a model to which clothes or items are reflected, such as a body model in which a body wears clothes, for example.

In the present embodiment, in particular, it is judged whether the body model can be combined with the hand model or not, or whether the body model can be combined with the foot model or not. There are two conditions to be used for judgement. One condition is a condition regarding a design of a body model and a length of a model to be connected to the body model (hereinafter, referred to as a "first adjacency condition"). The other condition is a condition regarding a size of both of the models at a connecting part between the body model and the model to be connected to the body model (hereinafter, referred to as a "second adjacency condition"). When the first adjacency condition and the second adjacency condition are satisfied, a change of the model is allowed.

FIG. 13 is a concept view illustrating a concept of a combination between a hand model and a body model. As illustrated in a left side of FIG. 13, the hand model 1040 is classified into plural stages in view of a length thereof. In the present embodiment, the hand model 1040 is classified into a short model 1041, a middle model 1042, and a long model 1043. As illustrated in a right side of FIG. 13, the body model 1030 containing up to a wrist is combined with the hand model 1040 with a classified length. Here, they are not necessarily able to be combined with each other as illustrated in a right side of FIG. 13. As described above, it is required that the first adjacency condition is satisfied.

FIG. 14 is an explanatory drawing for explaining an example of a storage state of information that indicates the first adjacency condition. A correspondence relationship for each item is defined in the form of a matrix. Combinations in the matrix to each of which a o-mark (circle) is applied indicate that the first adjacency condition is satisfied. Namely, specifically, the matrix means that a body model that can match with a long model (L matching body) can match with any of a short model (S hand model), a middle model (M hand model), and a long model (L hand model). On the other hand, combinations in the matrix to each of which a x-mark is applied indicate that the first adjacency condition is not satisfied. Namely, specifically, the matrix means that a body model that can match with a short model (S matching body) does not match with each of a middle model (M hand model) and a long model (L hand model).

FIG. 15 is a concept view illustrating a concept of a connecting part between a body model and a hand model. As illustrated in an upper column of FIG. 15, a body model and a hand model respectively include models for a large size (1035 and 1045) and models for a small size (1037 and 1047). The size mentioned herein means a size of a connecting part, and corresponds to an adjacent portion type. As illustrated in a lower column of FIG. 15, the models with the same size may be connected, and models with different sizes from each other may be combined. Here, they are not necessarily able to be combined with each other as illustrated in the lower column of FIG. 15. As described above, it is required that the second adjacency condition is satisfied.

FIG. 16 is an explanatory drawing for explaining an example of a storage state of information that indicates the second adjacency condition. A correspondence relationship for each item is defined in the form of a matrix. Combinations in the matrix to each of which a o-mark (circle) is applied indicate that the second adjacency condition is satisfied. Namely, specifically, the matrix means that in a case where a body model is a small size (S arm body), a size of a hand model can match with either a small size (S size hand) or a large size (L size hand). On the other hand, combinations in the matrix to each of which a x-mark is applied indicate that the second adjacency condition is not satisfied. Namely, specifically, the matrix means that in a case where the body model is a large size (L arm body), the size of the hand model does not match with the hand model with the large size (L size hand).

As described above, the first adjacency condition and the second adjacency condition have been described with respect to FIG. 12, FIG. 13, FIG. 14, FIG. 15, and FIG. 16 by using the relationship between the hand model and the body model as an example. Next, information regarding each of the models will be described. In the present embodiment, information to be associated is different depending upon a site. With respect to the body model, at least information indicating which length of a model the body model can match and information indicating a size of a connecting part are associated with each other. By associating these kinds of information with each other, it is possible to judge whether the first adjacency condition is satisfied or not and whether the second adjacency condition is satisfied or not. Further, with respect to the hand model, at least information regarding a type of a length and information indicating a size of a connecting part are associated with each other. By associating these kinds of information with each other, it is possible to judge whether the first adjacency condition is satisfied or not and whether the second adjacency condition is satisfied or not.

In this regard, a relationship between a foot model and a body model is similar to the relationship between the hand model and the body model. Therefore, explanation thereof is omitted herein.

Next, a configuration of the system 100 will be described.

The system 100 includes a server 10Z and user terminals 20, and 201 to 20N ("N" is an arbitrary integer. Hereinafter, they are simply referred to as "terminals 20, and 201 to 20N"). In this regard, a configuration of the system 100 is not limited to this, and the system 100 may be configured so that a plurality of users uses a single terminal.

The server 10Z has various kinds of functions to cause the video game to proceed. For example, the server 10Z has a function to process various kinds of information regarding each character in the virtual space. Further, the server 10Z has various kinds of functions to provide each of the plurality of terminals 20, and 201 to 20N with information for displaying a game image. Further, the server 10Z has various kinds of functions to communicate with an external apparatus such as the terminals 20, and 201 to 20N via a communication network 30. In the present embodiment, the server 10Z is constructed by an information processing apparatus such as a WWW server, and includes a storage medium for storing the various kinds of information. In this regard, the server 10Z may be configured so as to be provided with a storage region in a state that the server 10Z can access the storage region. For example, the system 100 may be configured so as to be provided with the storage region outside the system 100.

Figure 17:
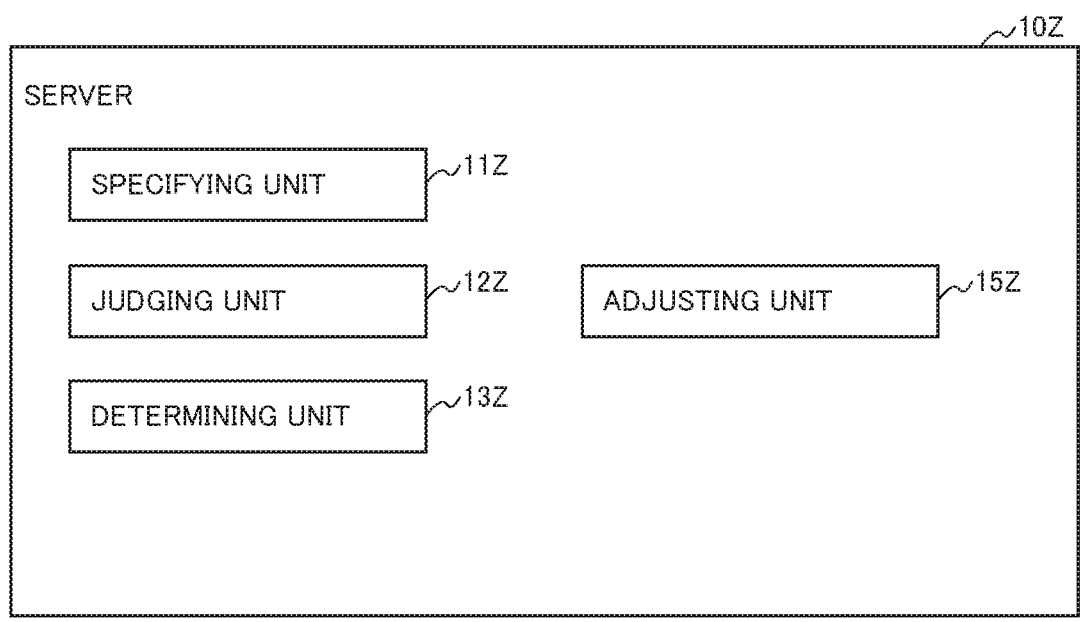
FIG. 17 is a block diagram illustrating a configuration of a server corresponding to at least one of the embodiments according to the present invention.

FIG. 17 is a block diagram illustrating a configuration of the server 10Z that is an example of the server 10. In the present embodiment, the server 10Z at least includes a specifying unit 11Z (which corresponds to one example of a specifying function), a judging unit 12Z (which corresponds to one example of a judging function), a determining unit 13Z (which corresponds to one example of a determining function), and an adjusting unit 15Z (which corresponds to one example of an adjusting function).

The specifying unit 11Z has a function to execute a process for specifying at least one model as a judgement target. In the present embodiment, it is configured so that a model that is to be changed by a change request from a user is set to the judgement target.

The judging unit 12Z has a function to execute a process for judging whether a judgement target and a model adjacent to a change target satisfy an adjacency condition or not. The adjacency condition includes a first adjacency condition and a second adjacency condition. Namely, the judging unit 12Z judges whether a relationship between the judgement target and the model adjacent to the change target is a relationship that both the first adjacency condition and the second adjacency condition are satisfied or not. Here, it is suitable that the adjacency condition is not a condition defining that interference between models is not allowed, but is a condition defining that a certain range of interference is allowed. Further, it is suitable that the certain range of interference is such a degree that it can be adjusted by a process by the adjusting unit 15Z (will be described later).

The determining unit 13 has a function to execute a process for determining whether the change target can be changed into the judgement target or not on the basis of a judgement result. In the present embodiment, the determining unit 13 also has a function to execute a process for changing the models in a case where it is determined that the change target can be changed into the judgement target. On the other hand, the determining unit 13 also has a function to execute a process for prohibiting selection of a model in a case where it is determined that the change target cannot be changed into the judgement target.

The adjusting unit 15Z has a function to execute a process for adjusting a shape of an adjacent model on the basis of information that is set to the model. In the present embodiment, the adjusting unit 15Z refers to a taper value that is set to a hand model or a foot model to gradually taper a portion of a body model adjacent to the other model (or a connecting part) toward a terminal portion thereof so as to prevent mismatching with a body portion with a continuous surface from occurring. Namely, in a case where the hand model is adjacent to the body model, an arm portion in the body model becomes thinner. Vertex color or the like is used for a definition of whether it is the terminal portion or not. Further, in the present embodiment, a definition regarding whether it is thick or thin is dealt by a positive or negative offset in a direction of a vertex normal. Further, the adjusting unit 15Z according to the present embodiment executes vertex processing on a GPU by using a shader. In this regard, the taper value that is set to the model may be set to zero. In this case, a result subjected to the adjustment also becomes the same result as that not subjected to the adjustment.

Each of the plurality of terminals 20, and 201 to 20N is managed by the user (or a player) who plays the video game, and is configured by a communication terminal, such as a cellular phone terminal, a PDA (Personal Digital Assistants), or a mobile game device, by which the user can play a network delivery type video game, for example. In this regard, a configuration of the terminal that the system 100 can include is not limited to the examples described above. It may be a configuration in which the user can recognize the video game. As other examples of the configuration of the terminal, there are a so-called wearable divide such as a smartwatch, and a combination of the wearable divide and the communication terminal.

Further, each of the plurality of terminals 20, and 201 to 20N is connected to the communication network 30, and includes hardware (for example, a display device for displaying a game screen, an audio output device and the like) and software for executing the video game by communicating with the server 10Z. In this regard, each of the plurality of terminals 20, and 201 to 20N may be configured so as to be capable of directly communicating with each other without the server 10Z. Further, each of the plurality of terminals 20, and 201 to 20N outputs an image of the video game to its own display device on the basis of information transmitted from the server 10Z (for example, information regarding a game image).

Next, an operation of the system 100 according to the present embodiment will be described.

Figure 18:
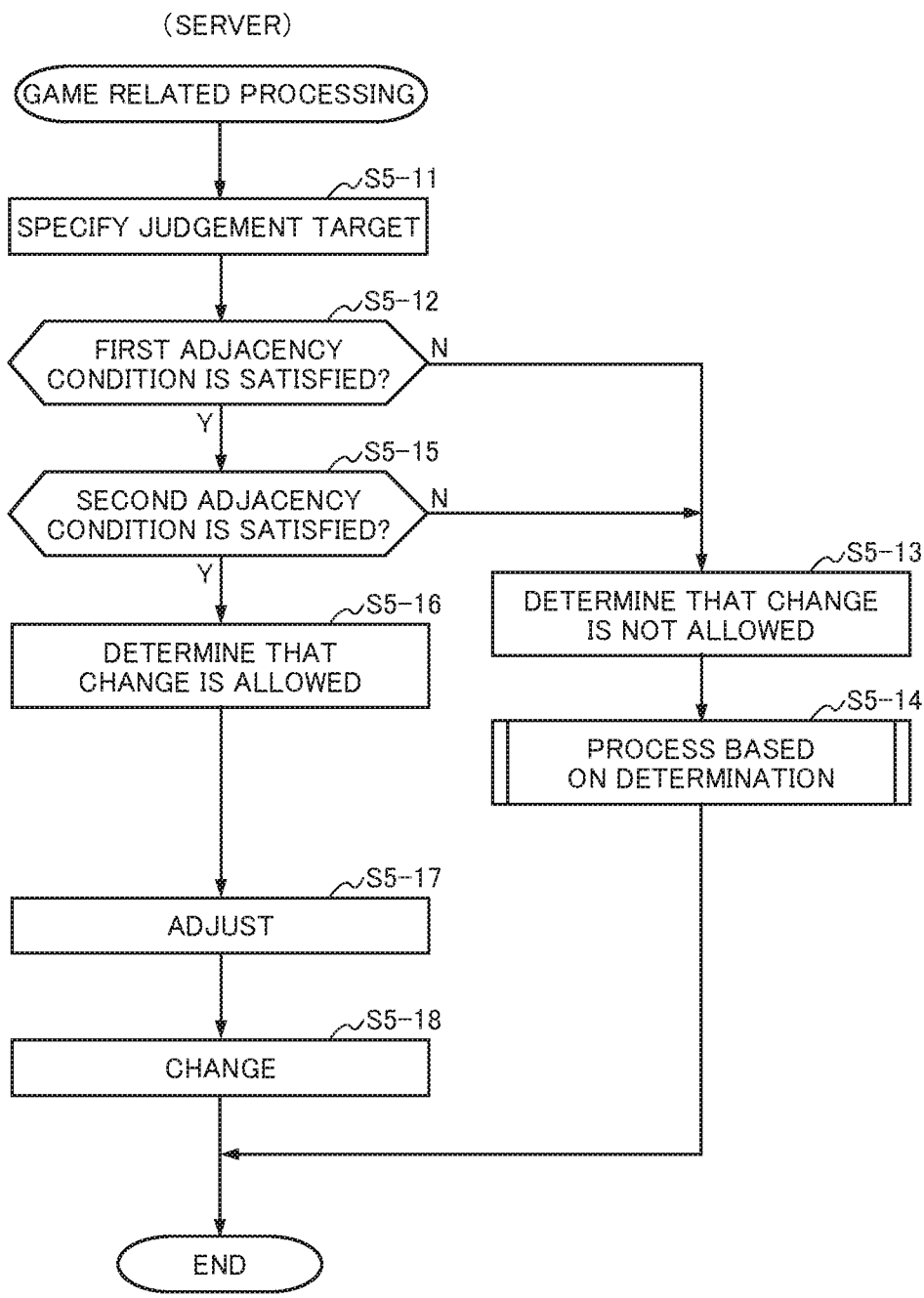
FIG. 18 is a flowchart illustrating an example of game related processing corresponding to at least one of the embodiments according to the present invention.

FIG. 18 is a flowchart illustrating an example of game related processing executed by the system 100. Hereinafter, an operation of the server 10Z will be described as an example. In this regard, explanation for a case where a terminal 20 (that is, a terminal 20 that includes similar functions to the configuration of the server 10Z) executes the game related processing by a single body, and portions that have already been explained are omitted from a point of view to avoid repeated explanation. The game related processing according to the present embodiment is executed in a case where information regarding a change request is received from the terminal 20 that received a change request for a hand model from the user.

In the game related processing, the server 10Z first specifies a judgement target (Step S5-11). In the present embodiment, the server 10Z specifies a hand model MDL1 designated by the user as the judgement target.

Subsequently, the server 10Z judges whether a first adjacency condition is satisfied or not (Step S5-12). In the present embodiment, the server 10Z judges whether the first adjacency condition is satisfied or not on the basis of a length of the hand model MDL1, a length with which a body model MDL9 can match, and information indicating the first adjacency condition.

In a case where it is judged that the first adjacency condition is not satisfied ("N" at Step S5-12), the server 10Z determines that the hand model cannot be changed (Step S5-13). Subsequently, when it is determined that the hand model cannot be changed, the server 10Z executes various kinds of processes based on determination that the hand model cannot be changed (Step S5-14), and terminates the processing herein. In the present embodiment, the server 10Z transmits image information to the terminal 20. The image information is used to cause the terminal 20 to display information indicating that the hand model cannot be changed.

On the other hand, in a case where it is judged that the first adjacency condition is satisfied ("Y" at Step S5-12), the server 10Z judges whether a second adjacency condition is satisfied or not (Step S5-15). In the present embodiment, the server 10Z judges whether the second adjacency condition is satisfied or not on the basis of a size of a connecting part of the hand model MDL1, a size of a connecting part of the body model MDL9 to the hand model MDL1, and information indicating the second adjacency condition.

In a case where it is judged that the second adjacency condition is not satisfied ("N" at Step S5-15), the server 10Z determines that the hand model cannot be changed (Step S5-13). On the other hand, in a case where it is judged that the second adjacency condition is satisfied ("Y" at Step S5-15), the server 10Z determines that the hand model can be changed (Step S5-16).

Subsequently, when it is determined that the hand model can be changed, the server 10Z adjusts the model (Step S5-17). In the present embodiment, the server 10Z refers to a taper value that is set to the hand model MDL1, and gradually tapers the connecting part of the body model MDL9 to be connected to the hand model MDL1 toward a terminal portion thereof.

When the model is adjusted, the server 10Z changes the model into the adjusted model (Step S5-18), and terminates the processing herein. In the present embodiment, the server 10Z changes a site of a hand of the model of a character into the hand model MDL1 to update character information, and reflects a tapering result of the body model MDL9 to the character information. Further, in the present embodiment, the server 10Z transmits the information thus updated and reflected to the terminal 20. In this regard, in the present embodiment, timing to execute the adjustment is timing after it is determined that that the hand model can be changed. However, this timing is not limited to such a configuration. For example, the system 100 may be configured so as to execute the adjustment when data to be displayed as a game image are generated. Namely, the system 100 may be configured so as to execute adjustment processing separately.

As explained above, as one side of the fifth embodiment, the system 100 for controlling progress of the video game is configured so as to at least include the specifying unit 11Z, the judging unit 12Z, and the determining unit 13Z. Thus, the specifying unit 11Z specifies at least one model as the judgement target; in a case where the change target is changed into the judgement target, the judging unit 12Z judges whether the predetermined adjacency condition is satisfied or not on the basis of the shape of the judgement target and the shape of the model adjacent to the change target; and the determining unit 13Z determines whether the change target can be changed into the judgement target or not on the basis of the judgement result. Therefore, it is possible to change appearance of a character without impairing the appearance of the character by a configuration with a smaller processing load.

In particular, the system 100 judges whether the adjacency condition is satisfied or not on the basis of the mutual shapes of the adjacent models. Namely, in a case where the mutual shapes of the adjacent models satisfy the adjacency condition in the system 100, it is possible to change one model into the other model that satisfies the adjacency condition. By configuring the system 100 in this manner, it is possible to change appearance of a character without impairing the appearance of the character by a configuration with a smaller processing load compared with a case where judgement of whether the models collide with each other (that is, collision judgement of the models) is executed.

Further, as one side of the fifth embodiment, the system 100 is configured so as to at least include the specifying unit 11Z, the judging unit 12Z, and the determining unit 13Z. Thus, the judging unit 12Z refers to the type of the shape that is set to each of the models to judge whether the predetermined adjacency condition is satisfied or not. Therefore, it is possible to change appearance of a character without impairing the appearance of the character by a configuration with a smaller processing load.

Namely, each model has the type of the shape, whereby compared with a case where collision judgement is executed, it is possible to make a processing load smaller in a case where appearance of a character is changed without impairing the appearance of the character even in a video game in which models with various shapes are adopted. In other words, the system 100 can realize diversity of the models with a smaller processing load than that in a conventional technique in the video game in which appearance of a character is changed without impairing the appearance of the character. Further, in a case where a new model is added thereto, it is possible to deal with it without rewriting information on conventional models. Therefore, the system 100 can improve the degree of freedom in design of the model with a smaller processing load than that in the conventional technique.

Further, as one side of the fifth embodiment, the system 100 is configured so as to at least include the specifying unit 11Z, the judging unit 12Z, and the determining unit 13Z. Thus, the judging unit 12Z refers to the adjacent portion type that is set to each of the models to judge whether the predetermined adjacency condition is satisfied or not. Therefore, it is possible to change appearance of a character without impairing the appearance of the character by a configuration with a smaller processing load.

Namely, each model has the adjacent portion type, whereby compared with a case where collision judgement is executed, it is possible to make a processing load smaller in a case where appearance of a character is changed without impairing the appearance of the character even in a video game in which models with various shapes are adopted. The system 100 can realize diversity of the models with a smaller processing load than that in a conventional technique in the video game in which appearance of a character is changed without impairing the appearance of the character. Further, in a case where a new model is added thereto, it is possible to deal with it without rewriting information on conventional models. Therefore, the system 100 can improve the degree of freedom in design of the model with a smaller processing load than that in the conventional technique.

Further, as one side of the fifth embodiment, the system 100 is configured so as to at least include the specifying unit 11Z, the judging unit 12Z, the determining unit 13Z, and the adjusting unit 15Z. Thus, the adjusting unit 15Z adjusts the shape of the adjacent model on the basis of the information that is set to the model. Therefore, it is possible to change appearance of a character without impairing the appearance of the character by a configuration with a smaller processing load.

Namely, the system 100 is configured so as to adjust a model, for which it is judged that the model can be changed, on the basis of the information that is set to the model while allowing the model to interfere with another adjacent model, thereby realizing a change in appearance of a character without impairing appearance thereof. In other words, upon providing a system by which appearance of a character is not impaired, the system 100 uses information that is set to the model without narrowing down models for each of which an adjacency condition is satisfied (that is, without enlarging restrictions in design of the model), thereby allowing a flexible response. Therefore, the system 100 can change appearance of a character without impairing the appearance of the character by a configuration with a smaller processing load, and variegate a combination of models.

In this regard, although it has not been mentioned particularly in the embodiments described above, the system 100 may be configured so as to refer to information in which a type of a changeable model is associated with each model and execute various kinds of judgement. Further, as another example, the system 100 may be configured so as to refer to information in which a shape of a model is classified for each model, information defining combinations that are allowed to adjoin thereto, and shapes of a changing side and a changed side, and judge whether the change is allowed or not. Further, a basis of the shape of the model means that it is based on appearance of the model. As an example of the configuration on the basis of the shape, there is a configuration on the basis of any one or more element of a form, a length, and a size.

In this regard, although it has not been mentioned particularly in the embodiments described above, the system 100 is configured so as to execute the adjustment even in a case where a taper value that is set to a model is zero. However, this is not limited to such a configuration. For example, the system 100 may be configured so as to judge whether the taper value is more than zero or not and execute the adjustment only in a case where the taper value is more than zero.

In this regard, although it has not been mentioned particularly in the embodiments described above, the system 100 is configured so as to adjust a change portion in the present embodiment. However, the system 100 may be configured to adjust models so as to reflect the taper values of all of the models when the character information is to be updated.

As explained above, each of the embodiments of the present application solves one or two or more shortages. In this regard, the effects by each of the embodiments are non-limiting effects or one example of the non-limiting effects.

In this regard, in each of the embodiments described above, each of the plurality of user terminals 20, 201 to 20N and the server 10 carries out the various kinds of processing described above in accordance with various kinds of control programs (for example, a program) stored in the storage device with which the corresponding terminal or server is provided. A control unit (not illustrated in the drawings particularly) may be configured so as to have functions to execute processes that are respectively to be executed by the units 11Z to 13Z and 15Z.

Further, the configuration of the system 100 is not limited to the configuration that has been explained as an example of each of the embodiments described above. For example, the system 100 may be configured so that the server 10 carries out a part or all of the processes that have been explained as the processes carried out by the user terminal. Alternatively, the system 100 may be configured so that any of the plurality of user terminals 20, 201 to 20N (for example, the user terminal 20) carries out a part or all of the processes that have been explained as the processes carried out by the server 10. Further, the system 100 may be configured so that a part or all of the storing sections included in the server 10 is included in any of the plurality of user terminals 20, 201 to 20N. Namely, the system 100 may be configured so that a part or all of the functions of any one of the user terminal 20 and the server 10 according to the system 100 is included in the other.

APPENDIX

The explanation of the embodiments described above has been described so that the following inventions can be at least realized by a person having a normal skill in the art to which the present invention belongs.

(1)

A program for causing a user terminal to realize functions to change appearance of a character composed of a plurality of models, wherein the functions include:

a specifying function configured to specify at least one model as a judgement target;

a judging function configured to judge, in a case where a model of a portion corresponding to the judgement target among a plurality of models (hereinafter, referred to as a "change target") is changed into the judgement target, whether a predetermined adjacency condition is satisfied or not on a basis of a shape of the judgement target and a shape of a model adjacent to the change target, the plurality of models constituting the character; and a determining function configured to determine whether the change target can be changed into the judgement target or not on a basis of a judgement result by the judging function.

(2)

The program according to (1), wherein the judging function includes a function configured to refer to a type of a shape that is set to each of the models to judge whether the predetermined adjacency condition is satisfied or not.

(3)

The program according to (1) or (2), wherein the judging function includes a function configured to refer to a type of a portion adjacent to another model that is set to each of the models to judge whether the predetermined adjacency condition is satisfied or not.

(4)

The program according to any one of (1) to (3), wherein the functions further include:

an adjusting function configured to adjust a shape of an adjacent model on a basis of information that is set to the model.

(5)

The program according to any one of (1) to (4), wherein the judging function includes a function configured to refer to a storage region to judge whether the predetermined adjacency condition is satisfied or not, model information being stored in the storage region, the model information containing a size of each of the models.

(6)

The program according to any one of (1) to (5), wherein the judging function includes a function configured to refer to a storage region to judge whether the predetermined adjacency condition is satisfied or not, model information regarding a body model containing up to a forearm and model information regarding a hand model containing at least a model whose part overlaps a portion contained in the body model being stored in the storage region.

(7)

The program according to any one of (1) to (6), wherein the judging function includes a function configured to refer to a storage region to judge whether the predetermined adjacency condition is satisfied or not, model information regarding a body model containing up to an ankle and model information regarding a foot model containing at least a model whose part overlaps a portion contained in the body model being stored in the storage region.

(8)

A program for causing a server to realize at least one function of the functions that the program described in any one of (1) to (7) causes the user terminal to realize, the server being capable of communicating with the user terminal.

(9)

A user terminal into which the program described in any one of (1) to (8) is installed.

(10)

A system for changing appearance of a character composed of a plurality of models, the system comprising:

a specifying unit configured to specify at least one model as a judgement target;

a judging unit configured to judge, in a case where a model of a portion corresponding to the judgement target among a plurality of models (hereinafter, referred to as a "change target") is changed into the judgement target, whether a predetermined adjacency condition is satisfied or not on a basis of a shape of the judgement target and a shape of a model adjacent to the change target, the plurality of models constituting the character; and a determining unit configured to determine whether the change target can be changed into the judgement target or not on a basis of a judgement result by the judging unit.

(11)

The system according to (10), wherein the server includes the specifying unit, the judging unit, and the determining unit, and wherein the user terminal includes:

a display unit configured to output a game image to a display screen of a display device on a basis of image information for displaying the game image, the image information being transmitted from the server, the game image indicating progress of a video game.

(12)

A program for causing a server to realize functions to change appearance of a character composed of a plurality of models, wherein the functions include:

a specifying function configured to specify at least one model as a judgement target;

a judging function configured to judge, in a case where a model of a portion corresponding to the judgement target among a plurality of models (hereinafter, referred to as a "change target") is changed into the judgement target, whether a predetermined adjacency condition is satisfied or not on a basis of a shape of the judgement target and a shape of a model adjacent to the change target, the plurality of models constituting the character; and a determining function configured to determine whether the change target can be changed into the judgement target or not on a basis of a judgement result by the judging function, and wherein the program causes a user terminal to realize an outputting function configured to output a game image to a display screen of a display device on a basis of information, the game image indicating progress of a video game transmitted from the server, the information being used for displaying the game image.

(13)

A program for causing a server to realize functions to change appearance of a character composed of a plurality of models, wherein the functions include:

a specifying function configured to specify at least one model as a judgement target;

a judging function configured to judge, in a case where a model of a portion corresponding to the judgement target among a plurality of models (hereinafter, referred to as a "change target") is changed into the judgement target, whether a predetermined adjacency condition is satisfied or not on a basis of a shape of the judgement target and a shape of a model adjacent to the change target, the plurality of models constituting the character; and a determining function configured to determine whether the change target can be changed into the judgement target or not on a basis of a judgement result by the judging function.

(14)

A method of changing appearance of a character composed of a plurality of models, the method comprising:

a specifying process of specifying at least one model as a judgement target;

a judging process of judging, in a case where a model of a portion corresponding to the judgement target among a plurality of models (hereinafter, referred to as a "change target") is changed into the judgement target, whether a predetermined adjacency condition is satisfied or not on a basis of a shape of the judgement target and a shape of a model adjacent to the change target, the plurality of models constituting the character; and a determining process of determining whether the change target can be changed into the judgement target or not on a basis of a judgement result by the judging process.

(15)

A method of changing appearance of a character composed of a plurality of models by a system, the system comprising a communication network, a server, and a user terminal, the method comprising:

a specifying process of specifying at least one model as a judgement target;

a judging process of judging, in a case where a model of a portion corresponding to the judgement target among a plurality of models (hereinafter, referred to as a "change target") is changed into the judgement target, whether a predetermined adjacency condition is satisfied or not on a basis of a shape of the judgement target and a shape of a model adjacent to the change target, the plurality of models constituting the character; and a determining process of determining whether the change target can be changed into the judgement target or not on a basis of a judgement result by the judging process.

INDUSTRIAL APPLICABILITY

According to one of the embodiments of the present invention, it is useful for a video game in which appearance of a character composed of a plurality of models is changed.

EXPLANATION OF REFERENCE NUMERALS 10 server
11 specifying unit
12 judging unit
13 determining unit
15 adjusting unit
20, 201 to 20N user terminal
30 communication network
100 system

The invention claimed is:

1. A non-transitory computer-readable media including a program for causing a user terminal to perform operations to change an appearance of a character, the character being composed of character models selected from among a plurality of available models, the operations comprising:
   specifying at least one of the plurality of available models as a judgement target;
   judging, in a case where a first model of the character models corresponding to the judgement target is to be changed into the judgement target, whether a predetermined adjacency condition is satisfied or not on a basis of a shape of the judgement target and a shape of a second model of the character models adjacent to first model; and
   determining whether the first model can be changed into the judgement target or not on a basis of a judgement result by the judging.

2. The non-transitory computer-readable media including the program according to claim 1,
   wherein the judging is configured to refer to a type of the shape that is set to the second model of the character models to judge whether the predetermined adjacency condition is satisfied or not.

3. The non-transitory computer-readable media including the program according to claim 1,
   wherein the judging is configured to refer to a type of a portion adjacent to a third model that is set to the second model of the character models to judge whether the predetermined adjacency condition is satisfied or not.

4. The non-transitory computer-readable media including the program according to claim 1, the operations further comprising:
   adjusting a shape of an adjacent model of the character models on a basis of information that is set to the first model.

5. A system for changing an appearance of a character, the character being composed of character models selected from among a plurality of available models, the system comprising:
   a processor; and
   a memory including a program that, when executed by the processor, causes the processor to perform operations, the operations including:
   specifying at least one of the plurality of available models as a judgement target;
   judging, in a case where a first model of the character models corresponding to the judgement target is to be changed into the judgement target, whether a predetermined adjacency condition is satisfied or not on a basis of a shape of the judgement target and a shape of a second model of the character models adjacent to the first model; and
   determining whether the first model can be changed into the judgement target or not on a basis of a judgement result by the processor.

6. A non-transitory computer-readable media including a program for causing a server to perform operations to change an appearance of a character, the character being composed of character models selected from among a plurality of available models, the operations comprising:
   specifying at least one of the plurality of available models as a judgement target;
   judging, in a case where a first model of the character models corresponding to the judgement target is to be changed into the judgement target, whether a predetermined adjacency condition is satisfied or not on a basis of a shape of the judgement target and a shape of a second model of the character models adjacent to the first model; and
   determining whether the first model can be changed into the judgement target or not on a basis of a judgement result by the judging.

* * * * *

UNITED STATES PATENT AND TRADEMARK OFFICE
CERTIFICATE OF CORRECTION

PATENT NO. : 11,161,042 B2
APPLICATION NO. : 16/648453
DATED : November 2, 2021
INVENTOR(S) : S. Sakata Page 1 of 1

It is certified that error appears in the above-identified patent and that said Letters Patent is hereby corrected as shown below:

In the Claims

At Column 21, Line 30 (Claim 1), please change "to first" to --to the first--.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*